(12) United States Patent
Rensch

(10) Patent No.: US 8,286,435 B2
(45) Date of Patent: Oct. 16, 2012

(54) JET ENGINE WITH AT LEAST ONE EMERGENCY DRIVE UNIT

(75) Inventor: Detlef Rensch, Ludwigsfelde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 832 days.

(21) Appl. No.: 12/385,520

(22) Filed: Apr. 9, 2009

(65) Prior Publication Data

US 2009/0255270 A1    Oct. 15, 2009

(30) Foreign Application Priority Data

Apr. 9, 2008 (DE) .......................... 10 2008 018 101

(51) Int. Cl.
*F02C 6/00* (2006.01)
(52) U.S. Cl. ........ 60/802; 60/39.15; 60/39.163; 60/786; 60/226.1
(58) Field of Classification Search .................. 60/802, 60/39.15, 39.163, 786, 787, 788, 778, 784, 60/226.1, 262
See application file for complete search history.

(56) References Cited

U.S. PATENT DOCUMENTS

| | | | |
|---|---|---|---|
| 2,611,239 A | 9/1952 | Briggs | |
| 2,643,511 A * | 6/1953 | Briggs | 60/788 |
| 3,662,544 A | 5/1972 | Kahn et al. | |
| 3,965,673 A | 6/1976 | Friedrich | |
| 4,864,812 A * | 9/1989 | Rodgers et al. | 60/39.091 |
| 5,039,281 A | 8/1991 | Johnston | |
| 5,123,239 A * | 6/1992 | Rodgers | 60/778 |
| 5,309,708 A | 5/1994 | Stewart, Jr. | |
| 5,385,011 A | 1/1995 | Stewart, Jr. | |
| 5,408,821 A * | 4/1995 | Romero et al. | 60/778 |
| 5,845,483 A * | 12/1998 | Petrowicz | 60/788 |
| 5,867,979 A * | 2/1999 | Newton et al. | 60/226.1 |
| 6,305,156 B1 * | 10/2001 | Lui | 60/785 |
| 6,378,293 B1 * | 4/2002 | Care et al. | 60/226.1 |
| 6,829,899 B2 * | 12/2004 | Benham et al. | 60/787 |
| 6,851,267 B2 * | 2/2005 | Bruno et al. | 60/787 |
| 7,481,062 B2 * | 1/2009 | Gaines et al. | 60/792 |
| 7,607,318 B2 * | 10/2009 | Lui et al. | 62/402 |
| 2006/0260323 A1 | 11/2006 | Moulebhar | |
| 2007/0017226 A1 | 1/2007 | Butt et al. | |
| 2009/0302152 A1 * | 12/2009 | Knight | 244/58 |
| 2010/0000226 A1 * | 1/2010 | Rensch | 60/784 |

FOREIGN PATENT DOCUMENTS

DE        2024125        1/1971

(Continued)

OTHER PUBLICATIONS

European Search Report dated Aug. 14, 2009 from counterpart European patent application.

*Primary Examiner* — William H Rodriguez
(74) *Attorney, Agent, or Firm* — Timothy J. Klima; Shuttleworth & Ingersoll, PLC

(57) ABSTRACT

A jet engine (1) includes at least one emergency drive unit (10), with the jet engine (1) having at least one engine shaft (2a) coupled via at least one gear train (4) with at least one auxiliary gearbox (7), which is connected to at least one auxiliary equipment (8), especially an electric generator. The emergency drive unit (10) includes at least one rotatable component. In order to provide a jet engine with an emergency drive unit in a simple configuration, the rotatable component of the emergency drive unit (10) is attached to the gear train (4).

20 Claims, 1 Drawing Sheet

FOREIGN PATENT DOCUMENTS

| | | |
|---|---|---|
| DE | 29 46 371 A1 | 5/1981 |
| DE | 35 15 770 A1 | 11/1986 |
| EP | 0189875 | 8/1986 |
| EP | 0200178 | 11/1986 |
| EP | 0 189 875 B1 | 10/1989 |
| EP | 0344454 | 12/1989 |
| EP | 1619370 | 1/2006 |
| GB | 2 063 188 A | 6/1981 |

* cited by examiner

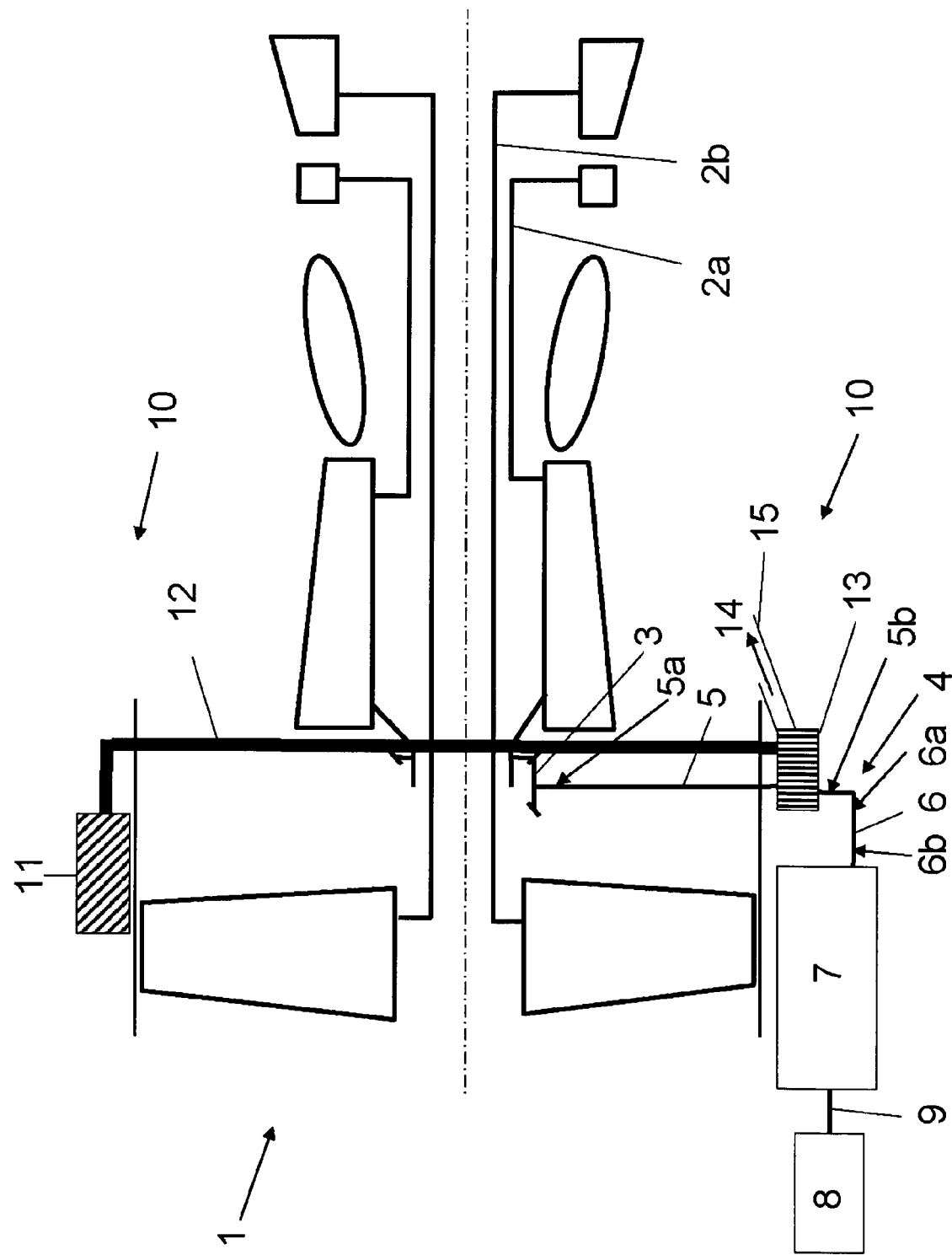

JET ENGINE WITH AT LEAST ONE EMERGENCY DRIVE UNIT

This application claims priority to German Patent Application DE102008018101.3 filed Apr. 9, 2008, the entirety of which is incorporated by reference herein.

This invention relates to a jet engine with at least one emergency drive unit. Furthermore, the present invention relates to an application of the jet engine as a main power plant of an aircraft and an application of the jet engine as an auxiliary power plant of an aircraft. In addition, the present invention relates to a method for driving auxiliary equipment on the jet engine.

State of the art for jet engines is the present-day turbofan engine. This engine category is increasingly used for the propulsion of aircraft on which the intensified use of auxiliaries increases the demand for electrical power. Electrical power is provided by generators which are driven by an engine shaft via a gear train and an auxiliary gearbox. Increased use of electrical consumers has created a requirement for larger generators. These generators are, however, heavier and demand more energy. On a two-shaft jet engine, this energy is taken from the high-pressure shaft.

Operational failures, in particular, entail a series of restrictions in the generation of power for the auxiliaries. These restrictions must duly be taken into account in the design of the engine. In a failure case, i.e. one jet engine is inoperative for example during take-off, the entire power required by the aircraft system including the auxiliaries must be delivered by the remaining, second jet engine.

The major disadvantage of this development is that the constant optimization of the aircraft to an ideal product is accompanied by a change of the boundary conditions for the jet engine. This applies especially to the electrical power demand of the aircraft. The resultant change and/or aggravation of the boundary conditions, in particular operability and stability in the failure case, constantly increase the problem of maintaining stable operation of the high-pressure compressor. Principally, it is attempted to operate the jet engine with minimum expenditure, thereby saving fuel.

With more-electric aircraft, this is made possible because the cabin air, among others, is produced by an electrically operated compressor, instead of tapping off a partial airflow from the engine compressor. Therefore, some boundary conditions, for example the cabin pressure limit, are no longer applicable. The cabin pressure limit is the pressure which, on conventional aircraft, the jet engine would at least be required to supply for pressurization of the cabin.

Provision is thus made that the jet engine is just kept running when operating under low-power conditions, such as descent or ground idle, and consequently also consumes less fuel. However, it must always be ensured that sufficient power is available in case of failure, e.g. one engine inoperative, to both supply the aircraft on-board systems with electrical power and maintain stable operation of the remaining jet engine.

In such a case, the electric systems of the aircraft will suddenly and unforeseeably demand a much higher amount of power from the jet engine than usually, before returning to a normal, albeit slightly higher level. This process takes about five seconds. The jet engine must be capable of withstanding this excursion without power loss. Technically, the problem can be solved in that the failure case is anticipated in engine operation by providing a certain buffer, i.e. a much higher amount of energy is produced which can be tapped in case of failure.

Disadvantageously, such buffering consumes fuel or may affect weight and costs as it must constantly be provided.

From Specification U.S. Pat. No. 3,965,673, a system with main engines and auxiliary engines is known. The system is provided with an emergency drive unit which can be used in the event of a failure of one of the auxiliary engines. The emergency drive unit will then operate the auxiliaries, for example a generator or pumps, via an auxiliary gearbox.

The auxiliary gearbox is here also coupled to the engine shaft of the auxiliary engine. The emergency drive unit is capable of starting one of the auxiliary engines.

This state of the art is expensive and complex. In addition, no arrangement is provided to bridge main-engine failure cases which are due to the aircraft systems.

A broad aspect of the present invention therefore is to provide a jet engine with an emergency drive unit in a simple arrangement.

In accordance with the present invention, solution to the problem is provided by a jet engine with at least one emergency drive unit. The jet engine has at least one engine shaft which is coupled via at least one gear train to at least one auxiliary gearbox which in turn is coupled to at least one auxiliary equipment, in particular an electric generator. The emergency drive unit has at least one rotatable component. The rotatable component of the emergency drive unit is provided on the gear train.

This arrangement is simply designed and, in case of failure of the jet engine, enables the auxiliaries to be driven by the emergency drive unit. In case of failure, the emergency drive unit serves, with high energy output, to unload the engine shaft. No additional power transmission arrangement is required.

The emergency drive unit for the auxiliary equipment is preferably a fluid-mechanical emergency drive unit. A fluid-mechanical emergency drive unit is capable of rapidly providing the driving power required by the auxiliary equipment.

In particular, the emergency drive unit may include at least one gas generator connected to at least one emergency turbine via at least one gas duct. Pressurized gas generated by the gas generator passes through the gas duct to drive the emergency turbine. The combination of gas generator and emergency turbine is a simple form of an emergency drive unit. If several gas generators are provided, the system, additionally, can be used multiple times.

In a further advantageous embodiment of the present invention, the gear train includes at least one shaft, and the at least one emergency turbine is arranged on the at least one shaft of the gear train. This enables the emergency drive unit to be arranged on the jet engine in a space-saving way. Moreover, no further gearing elements, as for example in U.S. Pat. No. 3,965,673, are required so that weight is also saved.

In particular, the gear train may include at least two shafts, with the two shafts between the engine shaft and the emergency turbine being detachably connected to each other. This enables the emergency turbine to be decoupled from the engine shaft, if required.

Furthermore, the gas generator is provided with a control mechanism. This ensures that the gas generator is ignited immediately upon occurrence of a failure case on the jet engine.

Particularly advantageous is a use of the jet engine as main power plant of an aircraft. In particular in case of failure of a main engine, operation of the emergency drive unit is crucial for maintaining the operation of the auxiliary equipment.

Alternatively, the jet engine can be used as an auxiliary power plant of an aircraft. Auxiliary power plants can also be subject to failure cases. Here as well, the emergency drive unit ensures that the operation of the auxiliary equipment is maintained.

Solution to the problem is further provided by a method for driving the auxiliary equipment on the jet engine. Here, at least part of the gear train producing the rotational speed required for the auxiliary equipment via the auxiliary gearbox is driven, with the emergency turbine co-rotating with the shaft of this part of the gear train. This method enables the auxiliary equipment to be driven in a simple manner without additional gearing elements. The emergency turbine co-rotates with the shaft of the gear train in a space-saving manner.

In this method, the engine shaft and/or the emergency turbine can drive at least part of the gear train. These alternatives enable the auxiliary equipment to be driven by the emergency turbine, the engine shaft or both, as required.

In case of failure of the jet engine, the gas from the gas generator drives the emergency turbine, and the emergency turbine drives part of the gear train. Thus, rotational energy for driving the auxiliary equipment is rapidly produced.

Preferably, the gas generator is started upon triggering the control mechanism. Thus, it is ensured that the gas generator is quickly ignited upon occurrence of a failure case.

In particular, the control mechanism can be triggered by a signal from the cockpit of an aircraft. This enables the control mechanism to be triggered immediately upon indication of a failure case of the jet engine in the cockpit.

Alternatively, the control mechanism can be triggered by a signal from the jet engine. In this case, the control mechanism can respond directly and rapidly to a failure case of the jet engine.

The signal can be based on a measuring value of the input torque of the auxiliary gearbox. This measuring value provides direct information on the requirement for rotational energy on the auxiliary gearbox.

The signal can also be based on a measuring value from a connecting cable of the electric generator. This measuring value provides information on the output power of the electric generator which is usable for determining the requirement for rotational energy on the electric generator.

In a special embodiment of the present invention, the gear train between the engine shaft and the emergency turbine is disconnectable. This enables the auxiliary equipment to be driven by the emergency drive unit independently of the engine shaft.

In addition, the emergency drive unit is capable of driving the engine shaft. This application of the emergency drive unit as starter of the jet engine enables a further arrangement for starting the jet engine to be dispensed with. In case of failure, the system therefore enables the jet engine to be first accelerated before power take-off at the engine shaft is significantly increased.

During faultless operation of the jet engine, the engine shaft drives the gear train, and the emergency turbine co-rotates freely on the shaft of the gear train. Therefore, the emergency turbine need not be removed or decoupled from the gear train during normal operation of the jet engine.

Moreover, the emergency turbine is capable of continuously driving the engine shaft through use of flow energy from the low-pressure system or an auxiliary system continuously drives the emergency turbine.

The present invention is more fully described in light of the FIGURE showing a preferred embodiment.

FIG. 1 shows a schematic representation of the jet engine with the emergency drive unit in accordance with the present invention.

FIG. 1 shows a jet engine 1 of the turbofan-type which includes, among others, two engine shafts, namely a high-pressure shaft 2a and a low-pressure shaft 2b. Furthermore, the jet engine 1 has a gear train 4 with a bevel gear 3, a first shaft 5 as well as a second shaft 6 and an auxiliary gearbox 7. The arrangement also includes auxiliary equipment 8 with a drive shaft 9.

FIG. 1 further shows an emergency drive unit 10. The emergency drive unit 10 includes a gas generator 11, a gas duct 12 and an emergency turbine 13 as rotatable component.

The high-pressure shaft 2a of the jet engine 1 is hollow and accommodates the low-pressure shaft 2b in its interior. The gear train 4 extends from the high-pressure shaft 2a in the interior of the jet engine to the outside and ends at the auxiliary gearbox 7.

The first shaft 5 of the gear train 4 has a first end 5a and a second end 5b and is inclined at an angle between 0° and 90° to the high-pressure shaft 2a. The high-pressure shaft 2a meshes with the bevel gear 3 of the gear train 4 via a toothing, which is not illustrated. The bevel gear 3 is fixedly connected to the first end 5a of the first shaft 5 of the gear train 4. The first shaft 5 carries, on its second end 5b, the emergency turbine 13.

The second shaft 6 has a first end 6a and a second end 6b and mechanically couples the first shaft 5 with the auxiliary gearbox 7. The first shaft 5 meshes on its second end 5b via a toothing, which is not illustrated, with an again not illustrated first toothing on the first end 6a of the second shaft 6 of the gear train 4. The second shaft 6 has on its second end 6b a second toothing, which is not illustrated, and which meshes with one or several gearwheels (not illustrated) of the auxiliary gearbox 7. The gearwheels of the auxiliary gearbox 7 mesh with a driving gear (not illustrated) on the drive shaft 9 of the auxiliary equipment 8, in particular an electric generator.

The gas generator 11 of the emergency drive, unit 10 is arranged outside of the jet engine 1. The gas duct 12 connects a gas outlet (not illustrated) of the gas generator 11 to a gas inlet (not illustrated) on the emergency turbine 13. The emergency turbine 13 is arranged on the second end 5b of the first shaft 5 and attached to the latter by way of a suitable hub-shaft connection. The emergency turbine 13 has an exhaust duct 15.

During operation of the jet engine 1, failure cases can occur, for example a five-second failure case or a one-second failure case. In this event, the supply of the aircraft with electrical power must be maintained. This is accomplished by the emergency drive unit 10. Upon occurrence of a failure case, the gas generator 11 of the emergency drive unit 10 is automatically ignited on the basis of a signal from the aircraft cockpit or directly from the jet engine.

The gas issuing under pressure from the gas generator 11 passes through the gas duct 12 to the emergency turbine 13, drives the emergency turbine 13 and leaves the emergency turbine 13 as exhaust gas 14 via the exhaust duct 15. The emergency turbine 13 drives the first shaft 5. The rotational energy is transmitted via the toothing on the second end 5b of the first shaft 5 to the toothing on the first end 6a of the second shaft 6.

The second shaft 6 transmits the rotational energy to the toothing on its second end 6b. This toothing drives the gearwheels of the auxiliary gearbox 7 which, in turn, drives the driving gear of the auxiliary equipment 8, in particular the electric generator. This enables the auxiliary equipment to operate even in case of failure of the jet engine 1.

Moreover, the emergency turbine 13 can act as a starter for the engine 1, by driving the high-pressure shaft 2a via the first shaft 5 and the bevel gear 3, thereby enabling normal operation of the jet engine to be resumed.

LIST OF REFERENCE NUMERALS

1 Jet engine
2a High-pressure shaft
2b Low-pressure shaft
3 Bevel gear
4 Gear train
5 First shaft
5a First end
5b Second end
6 Second shaft
6a First end
6b Second end
7 Auxiliary gearbox
8 Auxiliary equipment
9 Drive shaft
10 Emergency drive unit
11 Gas generator
12 Gas duct
13 Emergency turbine
14 Exhaust gas
15 Exhaust gas line

What is claimed is:

1. A jet engine, comprising:
   at least one engine shaft;
   at least one gear train including at least first and second shafts;
   at least one auxiliary gearbox coupled to the engine shaft via the first and second shafts of the gear train;
   at least one auxiliary equipment coupled to the auxiliary gearbox; and
   an emergency drive unit having at least one rotatable component, the rotatable component being attached to the gear train;
   wherein the emergency drive unit includes at least one emergency turbine;
   wherein the first shaft is connected to the engine shaft and the emergency turbine, the second shaft is connected to the auxiliary gearbox, and the first and second shafts are detachably connected to each other.

2. The jet engine of claim 1, wherein the emergency drive unit is a fluid-mechanical emergency drive unit.

3. The jet engine of claim 2, wherein the emergency drive unit includes at least one gas generator and at least one gas duct; wherein the at least one gas generator generates pressurized gas to drive the at least one emergency turbine, and the pressurized gas is supplied from the at least one gas generator to the at least one emergency turbine via the at least one gas duct.

4. The jet engine of claim 3, and further comprising a control mechanism for starting the gas generator as needed.

5. The jet engine of claim 3, wherein the emergency turbine is connectable to the gear train to drive the auxiliary equipment via the auxiliary gearbox.

6. The jet engine of claim 5, wherein at least one of the engine shaft and the emergency turbine drive the gear train.

7. The jet engine of claim 6, and further comprising a control mechanism to start the gas generator to drive the emergency turbine and the auxiliary equipment upon failure of the jet engine.

8. The jet engine of claim 7, wherein the control mechanism starts the generator upon receiving a triggering signal.

9. The jet engine of claim 8, wherein the triggering signal is generated from a cockpit of an aircraft.

10. The jet engine of claim 8, wherein the triggering signal is generated from the jet engine.

11. The jet engine of claim 10, wherein the triggering signal is based on a value of an input torque of the auxiliary gearbox.

12. The jet engine of claim 10, wherein the triggering signal is based on an output of the auxiliary equipment.

13. The jet engine of claim 10, wherein the gear train is disconnectable between the engine shaft and the emergency turbine.

14. The jet engine of claim 5, wherein the emergency turbine freely co-rotates with respect to the gear train during normal operation of the engine.

15. The jet engine of claim 5, wherein the emergency turbine is continuously driven by at least one of energy from a low-pressure system and an auxiliary system.

16. The jet engine of claim 1, wherein the jet engine is a main power plant of an aircraft.

17. The jet engine of claim 1, wherein the jet engine is an auxiliary power plant of an aircraft.

18. The jet engine of claim 1, wherein the emergency drive unit is selectively connectable to the engine shaft to drive the engine shaft.

19. A jet engine, comprising:
   at least one engine shaft;
   at least one gear train;
   at least one auxiliary gearbox coupled to the engine shaft via the gear train;
   at least one auxiliary equipment coupled to the auxiliary gearbox; and
   an emergency drive unit having at least one rotatable component, the rotatable component being attached to the gear train;
   wherein the emergency drive unit includes at least one emergency turbine;
   wherein the emergency turbine is connectable to the gear train to drive the auxiliary equipment via the auxiliary gearbox.

20. The jet engine of claim 19, wherein the emergency drive unit includes at least one gas generator and at least one gas duct; wherein the at least one gas generator generates pressurized gas to drive the at least one emergency turbine, and the pressurized gas is supplied from the at least one gas generator to the at least one emergency turbine via the at least one gas duct.

* * * * *